M. SAVIO.
BRAKE.
APPLICATION FILED MAY 12, 1915.
1,218,479. Patented Mar. 6, 1917.
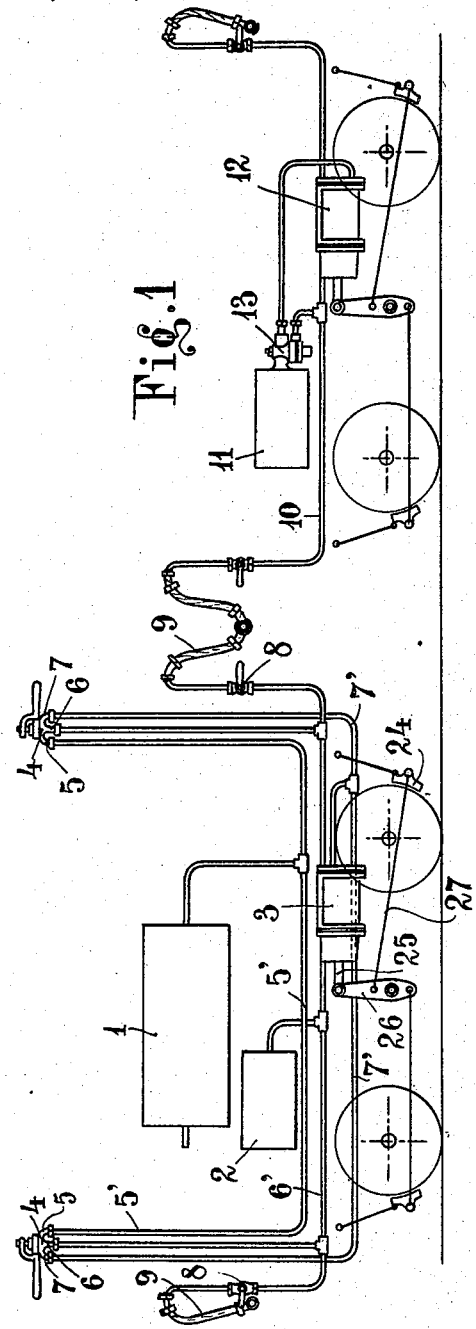
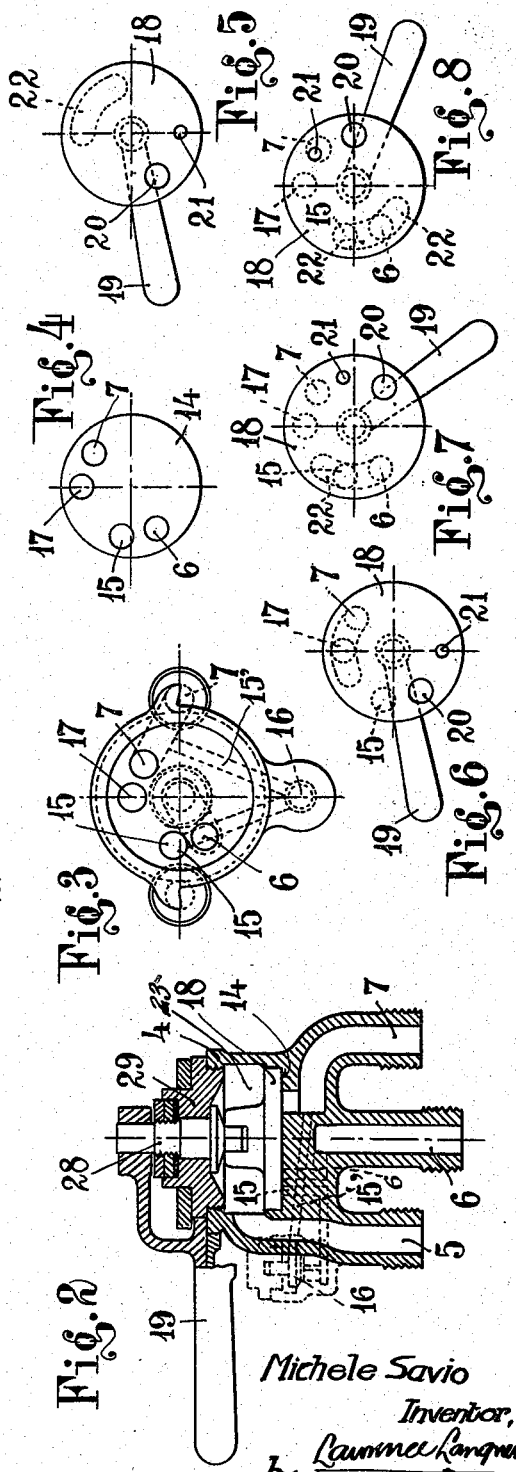
Witnesses:
H. Lanquet.
M. Abrams
Michele Savio
Inventor,
by Lawrence Lanquet
Attorney.

UNITED STATES PATENT OFFICE.

MICHELE SAVIO, OF TURIN, ITALY.

BRAKE.

1,218,479.   Specification of Letters Patent.   Patented Mar. 6, 1917.

Application filed May 12, 1915. Serial No. 27,566.

*To all whom it may concern:*

Be it known that I, MICHELE SAVIO, residing at Turin, Italy, have invented certain new and useful Improvements in Brakes, of which the following is a specification.

This invention relates to the compressed air brakes for railway and tramway cars and has for its object a brake by means of which it is possible to graduate the braking effect on the driving car and at the same time to obtain the automatic braking on the trailer car, a single triple valve being used which is mounted on the air reservoir of the trailer car.

In the annexed drawing is shown by way of example one construction of the brake according to this invention and Figure 1 is a diagrammatic side view of the plant; Fig. 2 is a vertical central section of the controlling valve, in which the rear portion is shown in dotted lines at a side of the valve for the purpose of illustration; Fig. 3 is a horizontal section of the valve; Fig. 4 shows the seat of the valve; Fig. 5 shows the distributing disk; Figs. 6, 7, and 8 show the different positions of the distributing disk with regard to its seat.

The driving car is provided as usual with a main reservoir 1, an auxiliary reservoir 2, the cylinder 3 the piston of which operates the brakes 24 by means of rod 25, lever 26 and bars 27, and two controlling valves 4, one arranged at each end of the car, within the reach of the driver.

As shown in Figs. 2 and 3, each of said valves comprises a casing 4 provided with three main passages 5, 6, 7, which are connected with the pipes 5', 6', 7' respectively. The pipe 5' leads to the main reservoir 1, the pipe 6' leads to the auxiliary reservoir 2 and the pipe 7' leads to the brake cylinder 3.

The pipe 6' is provided at its two ends with cocks 8 and flexible connections 9 intended to be connected with the pipe 10 mounted on the trailer car in which are also arranged an air reservoir 11 and the brake cylinder 12 in which is mounted the piston (not shown) controlling the brake blocks in the known manner.

The connection of the reservoir 11 with the pipe 10 and cylinder 12 is effected by means of an ordinary valve known as "triple-valve." It is to be noted that in the plant according to this invention only one of said triple-valves is required, which controls the brakes of the trailer car.

The valve 4 is provided with a seat 14 (Figs. 3 and 4), in which open the passages 6 and 7, the passage 15 leading to the passage 7 through a check valve 16 and passage 15', and the exhaust port 17.

The distributing disk 18 is mounted in the usual manner on the seat 14 and contacting with it, and is operated by the handle 19 secured to the pin 28 which is pivoted in the cap 29 and engages a recess of the disk 18, in the usual manner. Said disk is provided with two holes 20, 21 and with a recess 22 on the lower face contacting with the seat 14. The chamber 23 left above said disk communicates with the passage 5 and pipe 5' leading from the main reservoir 1 so that by operating the handle 19 and distributer 18 the compressed air supplied by the reservoir 1 may be directed to the passages 6 or 7 according to requirements.

When the distributing disk 18 is carried to the position shown in Fig. 6, the hole 20 of said disk coincides with the hole 6 of the seat 14 so that the compressed air passes from the reservoir 1 to pipe 6' leading to the auxiliary reservoir 2 of the driving car and to the reservoir 11 of the trailer car through the valve 13.

At the same time the air which previously operated the brake cylinder 3 exhausts through recess 22 connecting the hole 7 of the seat 14 with the exhaust port 17. The position of the parts shown in said Fig. 6 corresponds with the releasing of the brakes.

On the contrary when it is desired to apply the brakes the handle 19 is operated so as to carry the disk 18 in the position shown in Fig. 7; then the compressed air stored in the reservoir 2 is supplied to the brake cylinder 3 by the pipe 6', hole 6, recess 22, passage 15, check valve 16, passage 15', passage 7, and pipe 7'. At the same time the pressure falls down in the pipe 10 of the trailer car connected with pipe 6', and the triple-valve 13 is operated in the usual manner and causes the air stored in reservoir 11 to actuate the brake cylinder 12.

When the operation of the brakes on the driving car must be made more effective, then the connection of brake cylinder with auxiliary reservoir is cut out, and the same brake cylinder is connected with the main reservoir directly, the air stored in this latter being fed continuously to said cylinder and causing more efficient operation of the brakes. To that end the handle 19 is carried in the position shown in Fig. 8, then the compressed air stored in the main reservoir 1 is fed by the port 21 to the passage 7 and thus supplied to the brake cylinder 3 directly, said passage 7 being further connected with hole 6 by recess 22 and ports 15—15'.

By carrying the handle 19 in a position intermediate those shown in Figs. 6 and 7, the air of the reservoir 1 is fed in the pipe 6' in order to refill the auxiliary reservoirs and at the same time the air contained in the brake cylinders 3 is gradually exhausted because the outlet 7 of the pipe 7' is put in communication with the exhaust hole 17 of the valve seat.

The brakes of the trailer car are released in the usual manner by the triple valve when the air of the main reservoir is fed in the pipe 6' for filling the auxiliary reservoir 2 (position shown in Fig. 6).

When the driving car is not coupled with a trailer car the operation of the brakes is identical with that described provided both the cocks 8 of the pipe 6' are closed.

If the pipe 10 of the trailer car is not provided with cocks at its ends, or said cocks are open by mistake, the air contained in pipe 10 is exhausted to atmosphere when the trailer car is uncoupled from the driving car, and then the triple valve 13 causes the air stored in reservoir 11 to be fed to the brake cylinder 12 and apply the brakes. These brakes are released when compressed air is fed to pipe 10, the trailer car having been coupled again with the driving car and then the usual operation takes place. Obviously the discharge of the air contained in the pipe connected with reservoir 11 may be prevented by means of suitable valves or cocks inserted in the pipe connecting it with the piping of the driving car, said valves or cocks having to be closed before uncoupling the trailer car from the driving car.

By means of the described arrangement it is possible to graduate the braking effect on the driving car and at the same time the automatic operation of the brakes of the trailer car is obtained in case of the air connections are broken or released, the reservoir 11 discharging in the cylinder 12 by means of the triple valve, when the pressure falls in pipe 10. Further a single pipe connecting the driving car and the trailer car and a single triple valve are required, so that the cost of the plant is reduced and the operation is made easy and reliable.

What I claim as my invention and desire to secure by U. S. Letters Patent is:—

1. Compressed air brake comprising a main air reservoir, an auxiliary air reservoir, and a brake cylinder; pipes connecting said reservoirs and cylinder with a controlling valve; means in said valve for connecting directly either the main reservoir with the auxiliary reservoir, or the auxiliary reservoir with the brake cylinder, or the main reservoir with the brake cylinder.

2. Compressed air brake comprising a main air reservoir, an auxiliary reservoir and brake cylinder on the driving car; pipes connecting said reservoirs and cylinder with a controlling valve; a single piping on each trailer car connected with the pipe leading from the auxiliary reservoir to the controlling valve; a reservoir connected with said piping, a brake cylinder and an automatic valve on each trailer car, this valve controlling the connections of said reservoir with the piping and brake cylinder.

3. Compressed air brake comprising a main air reservoir, an auxiliary reservoir and brake cylinder on the driving car; pipes connecting said reservoirs and cylinder with a controlling valve casing, a distributer rotatable in said casing and operated by a handle, means in said distributer coöperating with ports of the seat of the valve for connecting directly either the pipe leading from the main reservoir with the pipe leading to the auxiliary reservoir, or the pipe leading to the auxiliary reservoir with the pipe leading to the brake cylinder, or the pipe leading from the main reservoir with the pipe leading to brake cylinder; a single piping on each trailer car connected with the pipe leading from the auxiliary reservoir to the controlling valve; a reservoir connected with said piping, a brake cylinder connected with said reservoir and an automatic valve on each trailer car, this valve being operated by the pressure in said piping for controlling the connection of said reservoir with the brake cylinder.

4. Compressed air brake comprising a main air reservoir, an auxiliary reservoir and brake cylinder on the driving car, pipes connecting said reservoirs and cylinder with a controlling valve casing; a distributer rotatable in said casing and operated by a handle; holes in said distributer coöperating with ports of the valve seat for connecting the pipe leading from the main reservoir either with the pipe leading to the auxiliary reservoir or with the pipe leading to the brake cylinder; a recess in said distributer for connecting the pipe leading from the auxiliary reservoir with the pipe leading to the brake cylinder; a single piping on each trailer car connected with the pipe leading from the auxiliary reservoir to the controlling valve; a reservoir connected with said piping, a brake cylinder connected with said reservoir and an automatic valve on each trailer car, this valve being operated by the pressure in said piping for controlling the connection of said reservoir with the brake cylinder.

5. Compressed air brake comprising a main reservoir, an auxiliary reservoir and a brake cylinder on the driving car, pipes connecting said reservoirs and cylinder with a controlling valve casing, a distributer rotatable in said casing and operated by a handle, holes in said distributer coöperating with ports of the valve seat for connecting the pipe leading from the main reservoir either with the pipe leading to the auxiliary reservoir or with the pipe leading to the brake cylinder, a recess in said distributer for connecting the pipe leading to the brake cylinder either with the pipe leading from the auxiliary reservoir or with the atmosphere; a single piping on each trailer car connected with the pipe leading from the auxiliary reservoir to the controlling valve; a reservoir connected with said piping, a brake cylinder connected with said reservoir and an automatic valve on each trailer car, this valve being operated by pressure in said piping for controlling the connection of said reservoir with the brake cylinder.

In testimony whereof I affix my signature in presence of two witnesses.

MICHELE SAVIO.

Witnesses:
CARLO TORTOR,
C. L. TEYLES.

Copies of this patent may be obtained for five cents each, by addressing the "Commissioner of Patents, Washington, D. C."